United States Patent [19]
Nezu

[11] Patent Number: 5,456,967
[45] Date of Patent: Oct. 10, 1995

[54] REFLECTION-TYPE SCREEN HAVING A DIMENSIONALLY STABLE SUBSTRATE

[75] Inventor: Michiko Nezu, Tokyo, Japan

[73] Assignee: Dai Nippon Printing Co., Ltd., Japan

[21] Appl. No.: 127,903

[22] Filed: Sep. 29, 1993

[30] Foreign Application Priority Data

Oct. 2, 1992 [JP] Japan .................. 4-287155

[51] Int. Cl.$^6$ .................................. G03B 21/58
[52] U.S. Cl. .................. 428/141; 428/142; 428/143; 428/148; 428/220; 428/323; 428/324; 428/328; 428/912.2; 428/913; 359/459; 359/452; 359/461
[58] Field of Search ............... 428/141, 142, 428/143, 148, 220, 323, 324, 328, 912.2, 913; 359/459, 452, 461

[56] References Cited

U.S. PATENT DOCUMENTS

| | | | |
|---|---|---|---|
| 1,720,232 | 7/1929 | North | 359/461 |
| 1,890,828 | 12/1932 | Richardson et al. | 359/461 |
| 2,821,883 | 2/1958 | Rusch | 359/461 |
| 2,875,087 | 2/1959 | Crandon | 359/459 |
| 3,314,742 | 4/1967 | Morgan | 359/459 |
| 3,811,750 | 5/1974 | Coulthard | 359/459 |
| 4,190,320 | 2/1980 | Ferro | 359/454 |
| 5,066,099 | 11/1991 | Yoshida et al. | 359/457 |

FOREIGN PATENT DOCUMENTS

| | | |
|---|---|---|
| 6440835 | 3/1989 | Japan . |
| 3119334 | 5/1991 | Japan . |

Primary Examiner—William P. Watkins, III
Attorney, Agent, or Firm—Parkhurst, Wendel & Rossi

[57] ABSTRACT

A reflection-type screen that is free from uneven formation attributable to a weave pattern of a ground fabric as a constituent material, can be wound up in a roll form and unwound at need and is less likely to cause deformation, such as buckling, elongation and sagging, and is easy to handle. The reflection-type screen includes a dimensionally stable substrate sheet having an elastic limit of 60 kg/cm$^2$ or more, a Young's modulus of elasticity of 2.5×10$^4$ kg/cm$^2$ or more, a bending modulus of elasticity of 3.5×10$^4$ kg/cm$^2$ or less, a thickness of 35 to 200 µm and a center line average height and a waviness of 100 µm or less each. Laminated on the substrate sheet in the following order is a high-density light diffusion-reflection layer and a translucent light diffusion layer including a soft vinyl chloride sheet, the translucent light diffusion layer having a surface provided with a light-diffusing fine uneven pattern. If necessary, a white or dark-color pigment may be added to the dimensionally stable substrate sheet. Further, in some cases, a white opaque resin layer or both a white opaque resin layer and a dark-color opaque resin layer are laminated in that order on the surface of the dimensionally stable substrate sheet remote from the high-density light diffusion-reflection layer.

5 Claims, 4 Drawing Sheets

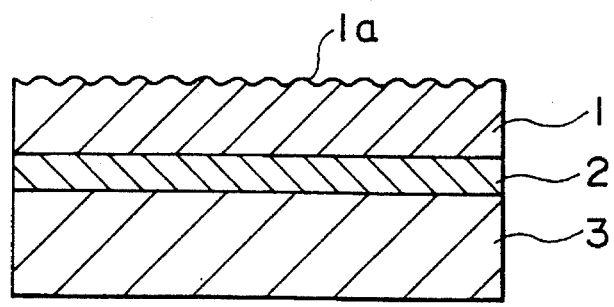
F I G. 1
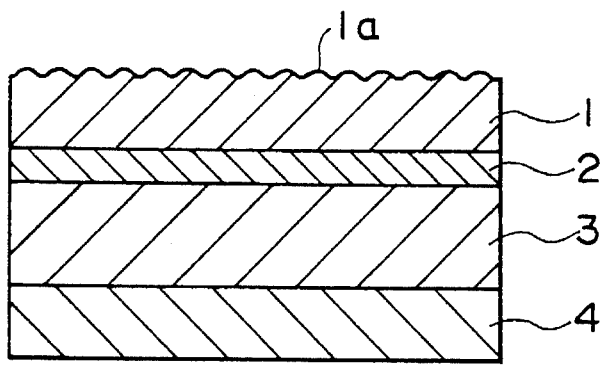
F I G. 2
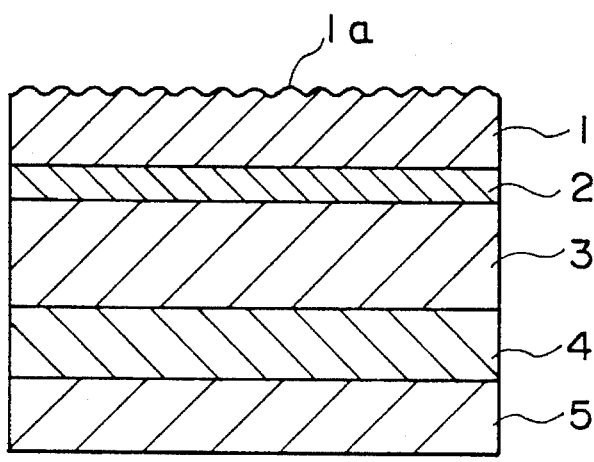
F I G. 3

REFLECTION-TYPE SCREEN HAVING A DIMENSIONALLY STABLE SUBSTRATE

BACKGROUND OF THE INVENTION

The present invention relates to a projection screen, particularly to a reflection-type screen for the projection of motion pictures in movies, projection-type televisions, and the like.

Screens for slide or OHP projections or projections of movies or videos generally comprise a laminate comprising a dark-color backing sheet and, laminated thereon, a white polyvinyl chloride sheet. Such screens reflect projected light in a homogeneous and isotropic manner in all directions, so that the homogeneity of the picture is high. However, the quantity of reflected light distributed in the vicinity of the direction of sight of an actual viewer is low, and the picture image is so dark that the projected image cannot be clearly viewed unless the room is darkened. On the other hand, there is a reflection-type screen using an aluminum reflecting plate having a roughened surface instead of the white sheet. In this screen, although the projected image can be clearly viewed in a bright room, since the screen is not flexible, it cannot be enclosed by winding.

A screen comprising a polyvinyl chloride sheet and reflective glass beads adhered thereto for the purpose of enhancing the reflectance and diffusion effect is known in the art. This screen, however, has a problem that the surface is uneven and likely to become contaminated and the glass beads are liable to peel off when dirt on the surface is wiped off. Further, the use of this type of screen as a wind-up screen causes the glass beads to unfavorably fall off when the screen is repeatedly wound up and unwound.

In connection with the screen comprising a dark-color backing sheet and a white polyvinyl chloride sheet, a technique is disclosed where a metallic deposit layer is provided as a reflecting layer on the polyvinyl chloride sheet, a translucent polyvinyl chloride sheet containing a pearl pigment is laminated on the reflecting layer and the surface of the laminate is embossed (see Japanese Utility Model Laid-Open No. 40835/1989).

The screen having a metallic reflecting layer has a problem that the light reflectance is so high that a halation occurs, which makes it difficult to view the projected image. Further, in the formation of the metallic deposit layer as the reflecting layer, the selection and pretreatment of the plastic sheet are important for facilitating the adhesion of the deposit layer. Polyester sheets, which are generally said to have a good adhesion to an aluminum deposit, are unfavorably liable to cause a fold mark. Specifically, the transportation or the repetition of winding/unwinding of the screen gives rise to a fold mark that is remarkably prominent due to its high light reflectance.

Further, when the whole layer comprises a soft material, such as a soft or semi-rigid polyvinyl chloride sheet, the stress created during winding/unwinding of the screen unfavorably gives rise to deformation such as elongation and sagging.

Japanese Patent Application 196763/1991 proposes a screen comprising a dimensionally stable ground fabric having on its back surface a light absorbing layer and, provided on the ground fabric in the following order, a white, opaque and soft plastic sheet and a light diffusing layer comprising a translucent and soft plastic and, incorporated into the plastic, a fine powder of a glitter or calcite, the screen having an embossed surface and a screen comprising a white, opaque and soft plastic substrate sheet having on its back surface a light absorbing layer and, provided on the substrate sheet, a light diffusing layer comprising a translucent and soft plastic and, incorporated into the plastic, a fine powder of a glitter or calcite, the screen having an embossed surface.

In this type of screen, it is difficult to form an exact fine uneven pattern on the surface of the screen due to a weave pattern of the glass ground fabric, uneven formation of the nonwoven fabric, etc., which renders the surface of the projection film uneven. This unfavorably gives rise to turbulence of the projected image or moire due to the interference of pixels with the uneven configurations, so that it is difficult to provide a configuration having stable optical properties.

DISCLOSURE OF THE INVENTION

An object of the present invention is to provide a reflection-type screen having stable proper optical properties, free from the occurrence of a weave pattern and uneven formation causative of moire or turbulence of the image on the projected plane, having a flexibility enough to be wound and unwound and, at the same time, less liable to cause permanent deformation, such as elongation and sagging, and having good handleability.

The reflection-type screen of the present invention is characterized by comprising a dimensionally stable substrate sheet (3) having an elastic limit of 60 kg/cm$^2$ or more, a Young's modulus of elasticity of $2.5 \times 10^4$ kg/cm$^2$ or more, a bending modulus of elasticity of $3.5 \times 10^4$ kg/cm$^2$ or less, a thickness of 35 to 200 µm and a center line average height and a waviness as measured according to JIS-B-0601 of 100 µm or less each and, laminated on said substrate sheet in the following order, a high-density light-diffusing/reflecting layer (2) comprising a resin containing a glitter in a dispersed state and a translucent light-diffusing layer (1) comprising a resin containing a glitter or a fine powder of calcite in a dispersed state, the elongation at breakage, modulus of elasticity and bending modulus of elasticity of said translucent light diffusion layer being equivalent to those of a soft polyvinyl chloride resin sheet containing 30 to 70 parts by weight of a plasticizer and having a degree of polymerization of 1000 to 2000 and a thickness of 80 to 300 µm, said translucent light diffusion layer (1) having a surface provided with a light-diffusing fine uneven pattern (1a).

If necessary, a white or dark-color pigment may be added so as to bring the opaqueness of the dimensionally stable substrate sheet (3) to 90% or more. Further, in some cases, a white and opaque resin layer (4) or/and a dark-color and opaque resin (5) may be provided in that order on the sheet remote from the high-density light-diffusing/reflecting layer (2).

BRIEF DESCRIPTION OF THE DRAWINGS

FIG. 1 is a fundamental cross-sectional view of the screen of the present invention;

FIG. 2 is a cross-sectional view of the screen of the present invention described in claim 2;

FIG. 3 is a cross-sectional view of the screen of the present invention described in claim 3;

BEST MODE FOR CARRYING OUT THE INVENTION

Figure 4:
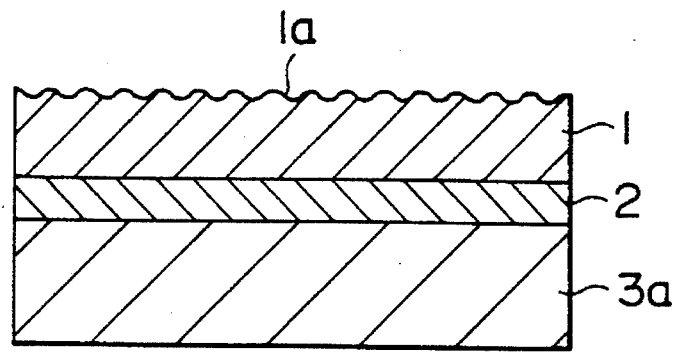
FIG. 4 is a cross-sectional view of the screen of the present invention described in claim 4.
Figure 5:
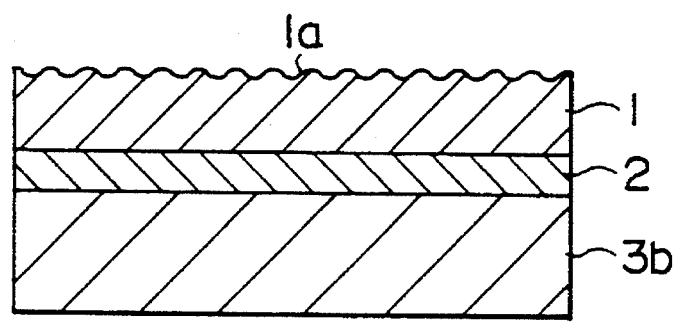
FIG. 5 is a cross-sectional view of the screen of the present invention described in claim 5.

The dimensionally stable substrate layer sheet serves to impart strength and dimensional stability to the screen. What is most important is for the screen to have a sufficient flexibility to be wound up in a columnar form having a minimum diameter of 30 mm when it is stored usually in a roll form and, at the same time, to be able to withstand a maximum width tension up to 20 kg/m to which the screen is exposed when it is wound up or unwound as to cause no deformation, such as sagging, curling and wrinkling, when it is subjected to repetition of winding and unwinding, to have a smoothness enough to avoid the appearance of uneven portions, such as weave pattern or uneven formation, on the uppermost surface through the translucent light-diffusing layer or the like, and further to undergo no adverse effect by heat and tension in the step of laminating or printing other materials.

These requirements can be satisfied by selecting materials from single plastics or laminating plastics. It is desired for these sheets to further have a light absorbing property, a whiteness, a reflecting property and other optical properties required of screens.

The dimensionally stable substrate sheet (3) used in the present invention should have a thickness in the range of from 35 to 200 μm and a bending modulus of elasticity of $3.5 \times 10^4$ kg/cm$^2$ or less since winding-type screens generally used in the art have a width of 100 to 200 cm, a winding shaft diameter of 30 to 60 mm and a total thickness of 0.3 to 1.5 mm in the case of the provision of a translucent light-diffusing layer (1) for imparting the function of the screen or lamination of an opaque resin layer on the back surface thereof.

Further, the tension created during winding/unwinding is usually up to 20 kg, and when a maximum tension of 20 kg is added to a minimum sheet cross-sectional area of 100 [cm]×3.5×10$^{-3}$ [cm]=3.5×10$^{-1}$ [cm$^2$], the maximum stress is 20 [kg]/3.5×10$^{-1}$ [cm$^2$]=57 [kg/cm$^2$]. In order to avoid permanent deformation in this state, the elastic limit should be 60 [kg/cm$^2$] or more.

The surface roughness and waviness should be sufficiently smaller than pixels and should not give rise to a moire fringe attributable to interference of pixels with the roughness and waviness on the surface of the screen.

This type of screen is used in a minimum dimension of 100 cm or more, and in the projected pixels, the number of scanning lines are 525 for usual televisions and 1125 for high-quality televisions. The period and dimension of the pixels are 100 cm/525 lines=1900 μm to 100 cm/1125 lines=890 μm/lines.

Although the required properties are somewhat different depending upon the configuration of pixels, the configuration and mechanism of the light-diffusing fine uneven pattern, the presence of black stripes, etc., the surface roughness and waviness may be about one order smaller than the dimension and period of the above-described pixels, that is, 100 μm or less.

The surface roughness and waviness are measured by the measuring method specified in JIS-B-0601. In order not to cause wrinkling or sagging even when the screen is repeatedly wound round a winding shaft having a minimum diameter of 30 mm and unwound at a maximum tensile stress of 60 [kg/cm$^2$], proper elasticity and hardness are necessary. With the consideration of lamination of a translucent light-diffusing layer, etc. as a layer essential to the screen of the present invention, the elasticity and hardness requirements are satisfied when the Young's modulus of elasticity is $2.5 \times 10^4$ [kg/cm$^2$].

The lamination of a soft plastic sheet on the dimensional substrate sheet enables the two layers to make up for each other with respect to the hardness and softness and the easiness and difficulty of deformation, which offers the balance of these properties, so that the whole laminate (screen) can attain a combination of the capability of withstanding deformation, such as elongation and sagging, with a flexibility enough sufficient to render the screen windable and unwindable.

A soft plastic layer best suited for this purpose is an 80 to 300 μm-thick sheet comprising polyvinyl chloride having an average degree of polymerization of 1000 to 2000 and containing 30 to 70 parts by weight, in terms of dioctyl phthalate (DOP), of a plasticizer. Further, other resins may also be used so far as they have mechanical properties, such as elongation at breakage, Young's modulus of elasticity and bending modulus of elasticity, equivalent to the above-described plastic sheet.

Examples of the plastic sheet for the dimensionally stable substrate sheet (3) capable of satisfying the above requirements include single sheets based on transparent, white or black stretched polyethylene terephthalate, polybutylene terephthalate, stretched polyamides (nylon 6 and nylon 66), cellulose triacetate, polystyrene, polyacrylate, polycarbonate, Noryl (trademark of General Electric), polyether sulfone and methyl polymethacrylate, synthetic paper produced from high-density plastic sheets, and milky parchment paper free from ply separation and produced by subjecting paper comprising natural cellulose and, added thereto, titanium white to a sulfuric acid treatment. These sheets may be used in a single layer form or alternatively may be used in the form of a laminate comprising a plurality of layers so far as the above-described property requirements are satisfied. A soft plastic sheet having a larger modulus of elasticity than the dimensionally stable substrate sheet is laminated as the high-density light-diffusing/reflecting layer (2), translucent light-diffusing layer (1) and white or dark-color opaque resin layer (4 or 5) optionally laminated on the back surface of these sheets.

Examples of the soft plastic sheet usable in this case include unstretched sheets of soft polyvinyl chloride, polyethylene, ethylene/vinyl acetate copolymer (EVA), ionomer, ethylene/ethyl acrylate copolymer (EEA), ethylene/acrylic acid copolymer (EAA), methylpentene polymer and polybutene having an average degree of polymerization of 1000 to 2000 and containing 30 to 70 parts by weight, in terms of dioctyl phthalate (DOP), of a plasticizer.

A layer provided by kneading a white pigment and a glitter with a plastic and forming a film from the kneaded product may be used as the high-density light-diffusing/ reflecting layer (2). However, it is difficult for a large amount of a coarse glitter to be dispersed into the plastic. Further, the use of an expensive glitter in a large amount is not advantageous. Since a layer containing a large amount of an inorganic material has a low flexibility, it is advantageous that a resin layer containing a glitter is formed by printing on a sheet formed from a kneaded product comprising a plastic and, kneaded therewith, a white pigment alone, if necessary, after a primer layer is provided.

Examples of the glitter are as follows.
- (i) Pearl pigments such as those produced by grinding the inner part of shells or pearls; mica; or those produced by bake-coating titanium oxide or iron oxide on scaly fine particles of mica having an average particle diameter of 10 to 30 m.
- (ii) Metallic powders having a size of 1 to 120 μm of copper, aluminum, brass, bronze, gold, silver, etc.
- (iii) Fragments of polyethylene terephthalate films having a vacuum-deposited overcoat of the above-described metals, usually aluminum.

These glitters are preferably in a scale form, and high-bright irregular reflection can be attained by providing the surface of the scale parallel to the surface of the sheet.

Pearl pigments comprising mica coated with titanium oxide are particularly preferred.

The size of the fine powder of the calcite is preferably in the range of from 2 to 20 μm. The fine powder is produced so as to provide a narrow particle size distribution as much as possible. For example, when the average particle diameter is 5 μm, the fine powder is selected in such a manner that 80% or more of the particles are occupied by particles having a particle diameter in the range of from 3 to 7 μm.

The plastic layer as the translucent light-diffusing layer (1) serves to pass light once diffused and reflected by the high-density light-diffusing/reflecting layer and, at the same time, to diffuse part of the light, thereby reducing glare of the picture plane and further properly widening the field of view. The amount of the glitter or the fine powder of calcite to be added to the translucent light-diffusing layer (1) is preferably in the range of from 0.5 to 10% by weight, still preferably 2% by weight.

The high-density light-diffusing/reflecting layer (2) serves to efficiently reflect substantially all the projected light and, at the same time, to adequately diffuse the reflected light. Since the thickness of this layer may be as small as several μm, the layer is preferably formed by printing or coating. In this case, the ink used comprises a dispersion of a glitter in the highest possible concentration in a conventional binder resin.

The vehicle comprises a solution of a vinyl chloride/vinyl acetate copolymer, an acrylic resin, a urethane resin, a polyester resin or the like dissolved in a suitable solvent.

In the ink composition, the amount of the vehicle is preferably in the range of form 1 to 100 parts by weight, particularly preferably in the range of from 10 to 50 parts by weight, based on 100 parts by weight of the pigment, and other ink assistants, such as surfactants, are added thereto to form an ink.

The selection of a material having a good adhesion to a translucent bright emboss layer is preferable for the resin composition of the ink binder, and preferred examples of the material include a vinyl chloride/vinyl acetate copolymer and a urethane compound.

The thickness of the ink coating should be such that the whole surface of the sheet to be printed is covered with the glitter. It is preferably in the range of from 1 to 10 μm, preferably in the range of from 2 to 4 μm.

Since an ink comprising a material having a poor affinity for the vehicle, such as a glitter, is likely to render the surface uneven during printing, the effect of diffusing light can be increased with a reduction in the amount of the ink necessary for covering the whole surface by effecting overprinting several times.

In the ink composition using a fine powder of calcite, since the concentration of the calcite is preferably high as much as possible for the abovedescribed reason, the amount of vehicle is preferably in the range of from 1 to 100 parts by weight, particularly preferably in the range of from 10 to 50 parts by weight, based on 100 parts by weight of the fine powder of calcite.

The ink composition can be coated by printing methods, such as gravure printing and silk screen printing, and known techniques, such as spray coating and roll coating. In this case, it is necessary to homogeneously cover the whole surface and, at the same time, for the thickness of the coating to be 1 μm or more on a dry basis.

When no high-density light-diffusing/reflecting layer (2) is provided, the thickness of the translucent light-diffusing layer (1) is preferably in the range of from 80 to 100 μm for the purpose of reducing a lowering in the quantity of the reflected light to keep the projected light brightly.

On the other hand, when the light-diffusing/reflecting layer (2) is provided, since the lowering in the quantity of the reflected light is small, the thickness is preferably in the range of from 50 to 300 μm from the viewpoint of increasing the thickness of the light-diffusing layer to scatter the light beam, thereby increasing the half-value angle.

In order to further enhance optical properties of the reflection-type screen, it is preferred to laminate a white and opaque resin layer (4) and additionally a dark-color and opaque resin layer (5) on the surface of the dimensionally stable resin layer remote from the high-density light-diffusing/reflecting layer (2).

The white and dark-color opaque resin layers comprise a plastic sheet comprising a resin having properties equivalent to the above-described translucent light-diffusing layer (1) and, added and dispersed therein in a proper amount, a white pigment, such as titanium oxide, so as to provide an opaqueness of 90% or more in the case of the white layer and carbon black and other color pigments composed mainly of metallic powders, such as aluminum powder.

Further, either the white and opaque resin layer (4) or the black and opaque resin layer (5) may serve also as the dimensionally stable resin layer. In this case, a white pigment, a black pigment or the like is dispersed in the dimensionally stable resin to construct the layer. In some cases, use may be made of synthetic paper or other materials produced by subjecting these plastic sheets subjected to high-density processing.

Moreover, the white and opaque resin layer (4) and black and opaque resin layer (5) may be formed by laminating previously formed sheets that may be provided by coating or printing.

In order to prevent curling of the screen, it is preferred to laminate layers having the same properties respectively on both surfaces of the dimensionally stable substrate sheet (3).

More specifically, a layer construction described in claim 2 or 3 is an example thereof.

The reflection-type screen of the present invention can be produced by integral lamination according to any of a hot press fusing method and a dry lamination method. The uneven pattern (1a) on the surface of the screen can be formed also by embossing in the stage of forming a translucent bright plastic sheet or by hot pressing during hot fusing using an embossing plate.

The fine uneven pattern (1a) may be a pattern comprising waves crossing each other at 90° C. or any other pattern, such as a grain pattern, a satin pattern, a hairline pattern, a columnar lenticular lens pattern, a triangular prism lenticular lens pattern and a bonds lens pattern. When spectators are present not only in the front but also in the left and right sides of the screen, it is necessary to diffuse light in a horizontal direction. For this purpose, the use of a fine uneven pattern is preferred wherein axis forms a semicolumnar lenticular lens group in the vertical direction. In the case of projection in liquid crystal display televisions wherein pixels are periodically arranged in the lengthwise and crosswise directions, the use of a random and nonperiodical uneven pattern, such as a sand or satin pattern, is preferred because no moire occurs.

Figure 8:
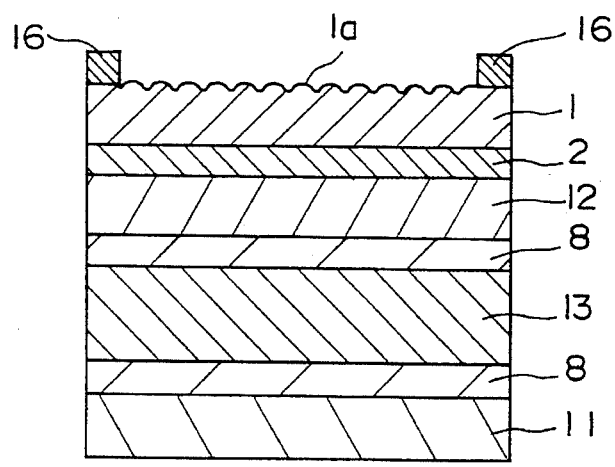
FIG. 8 is a cross-sectional view of a reflection-type screen provided in Example 3.

Further, as shown in FIG. 8, when an outer frame (16) is printed with a dark-color ink on the surface of the reflection-type screen of the present invention by suitable means such as silk screen printing, not only the edge of the image can be properly trimmed but also the picture plane can become more clear.

In the screen of the present invention, excellent dimensional stability and flexibility in combination with the prevention of permanent deformation, such as wrinkling and sagging, and a proper light diffusibility and a proper light reflectance could be attained by providing on a dimensionally stable substrate sheet having flexible, dimensionally stable and smooth properties a high-density light-diffusing/reflecting layer comprising a brightening ink and a translucent light-diffusing layer comprising a soft plastic provided with a fine uneven pattern.

EXAMPLES Examples of the production of the reflection-type screen of the present invention will now be described with reference to the accompanying drawings.

Example 1

Figure 6:
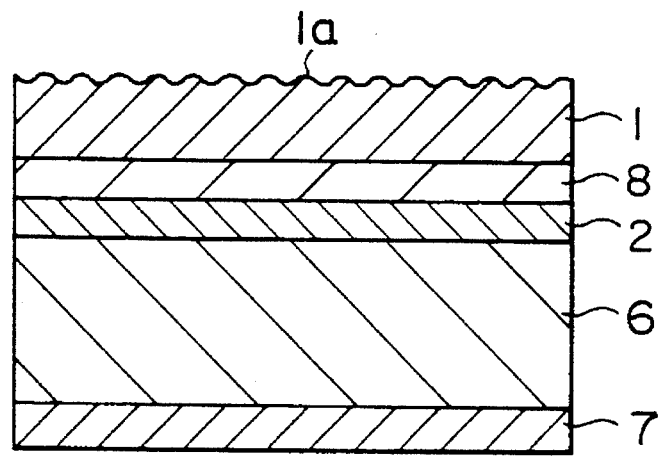
FIG. 6 is a cross-sectional view of a reflection-type screen provided in Example 1.

As shown in FIG. 6, a black solid print (7) was provided on the back surface of synthetic paper (6) (Yupo manufactured by Oji-Yuka Synthetic Paper Co., Ltd., weight per unit area: 300 g/m$^2$, elastic limit: 90 kg/cm$^2$, Young's modulus of elasticity: 2.7×10$^4$ kg/cm$^2$, bending modulus of elasticity: 2.1×10$^4$ kg/cm$^2$, opaqueness: 98%) as a dimensionally stable substrate sheet, and a brightening ink having the following composition was printed on the surface of the substrate sheet remote from the black solid print (7) by gravure printing to a thickness on a dry basis of 3 μm to provide a high-density light-diffusing/reflecting layer (2). t,0140

A 200 μm-thick translucent soft vinyl chloride sheet (1) having a sand fine uneven pattern (1a) and the following composition containing a pearl pigment was laminated on the reflection sheet through a polyurethane adhesive (8) to provide a reflection-type screen (see FIG. 6). t,0150

The half-value angle of the reflection-type screen of the present invention thus obtained was measured and found to be 35°. The term "half-value angle" used herein is intended to mean an inclination relative to a vertical line that the brightness becomes half in the horizontal direction based on the brightness of the front of the screen.

Further, neither weave pattern nor uneven formation found in projection sheets provided through a fiber layer was observed. Moreover, when a sheet having a size of 150 cm×112.5 cm was subjected to a winding/unwinding repetition test under conditions of an inner diameter of 30 mm and a tension of 10 kg 50 times, the test results were good, and neither dimensional change, such as buckling, sagging, wrinkling and elongation, nor a change in surface appearance occurred.

Example 2

Figure 7:
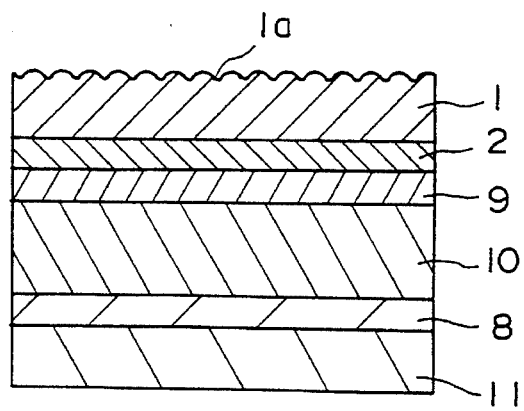
FIG. 7 is a cross-sectional view of a reflection-type screen provided in Example 2.

As shown in FIG. 7, a soft vinyl chloride sheet (11) containing 1% carbon black and having a composition according to formulation specified in Example 1 was pasted instead of the titanium-oxide-coated mica on a white and biaxial stretched polyester film (a product of Toray Industries, Inc., thickness: 100 μm, elastic limit: 90 kg/cm$^2$, Young's modulus of elasticity: 4.5×10$^4$ kg/cm$^2$, bending modulus of elasticity: 28×10$^4$ kg/cm$^2$, opaqueness: 98%) as a dimensionally stable substrate sheet (10) through a polyurethane adhesive (8), and after a linear polyester/isocyanate primer layer (9) was provided on the white surface of the sheet, two-color printing of a brightening ink described in Example 1 was effected by gravure solid printing to a thickness of 3 μm to provide a sheet having a high-density light-diffusing/reflecting layer (2). The above-described 120 μm-thick translucent soft vinyl chloride sheet (1) containing a pearl pigment and an embossing plate having a sand pattern were laminated in that order on the high-density light-diffusing/reflecting layer (2), and the laminate was subjected to hot press doubling for integration and, at the same time, provision of an uneven pattern (1a). The half-value angle of the reflection-type screen (FIG. 7) of the present invention was measured and found to be 45°.

Further, neither weave pattern nor uneven formation found in projection sheets provided through a fiber layer was observed. Moreover, when a sheet having a size of 200 cm×150 cm was subjected to a winding/unwinding repetition test under conditions of an inner diameter of 30 mm and a tension of 15 kg 50 times, the test results were good, and neither dimensional change, such as buckling, sagging, wrinkling and elongation, nor a change in surface appearance occurred.

Example 3

As shown in FIG. 8, a 200 μm-thick soft vinyl chloride sheet (12) as a white and opaque resin layer, a 25 μm-thick stretched nylon film (elastic limit: 120 kg/cm$^2$, Young's modulus of elasticity: 2.7×10$^4$ kg/cm$^2$, bending modulus of elasticity: 2.9×10$^4$ kg/cm$^2$, opaqueness: 98%) (13) as a dimensionally stable substrate sheet and a soft vinyl chloride sheet (11) containing 1% of carbon black and having a composition according to formulation specified in Example 1 were laminated in that order through a polyurethane adhesive (8) to provide a sheet, and two-color printing of a brightening ink described in Example 1 was effected on the white surface of the sheet by gravure solid printing to a thickness of 3 μm to provide a high-density light-diffusing/reflecting layer (2). The above-described 120 μm-thick translucent soft vinyl chloride sheet (1) containing a pearl pigment and an embossing plate having a sand pattern were laminated in that order on the high-density light-diffusing/reflecting layer (2), and the laminate was subjected to hot press doubling for integration and, at the same time, provision of an uneven pattern (1a). A black frame (16) having a width of 3 cm was provided by silk screen printing with a black ink on the surface of the screen to produce the reflection screen of the present invention (FIG. 8) surrounded in a square form having a diagonal line length of 2.5 cm. The half-value angle of the reflection-type screen of the present invention was measured and found to be 45°.

Further, neither weave pattern nor uneven formation found in projection sheets provided through a fiber layer was observed. Moreover, when the sheet was subjected to a winding/unwinding repetition test under conditions of an inner diameter of 60 mm and a tension of 15 kg 50 times, the test results were good, and neither dimensional change, such as buckling, sagging, wrinkling an elongation, nor a change in surface appearance occurred. The half-value angle of the reflection-type screen of the present invention thus obtained was measured and found to be 45°.

Example 4

Figure 9:
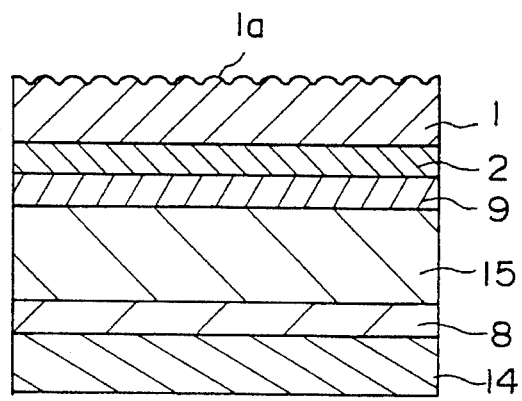
FIG. 9 is a cross-sectional view of a reflection-type screen provided in Example 4.
Figure 10:
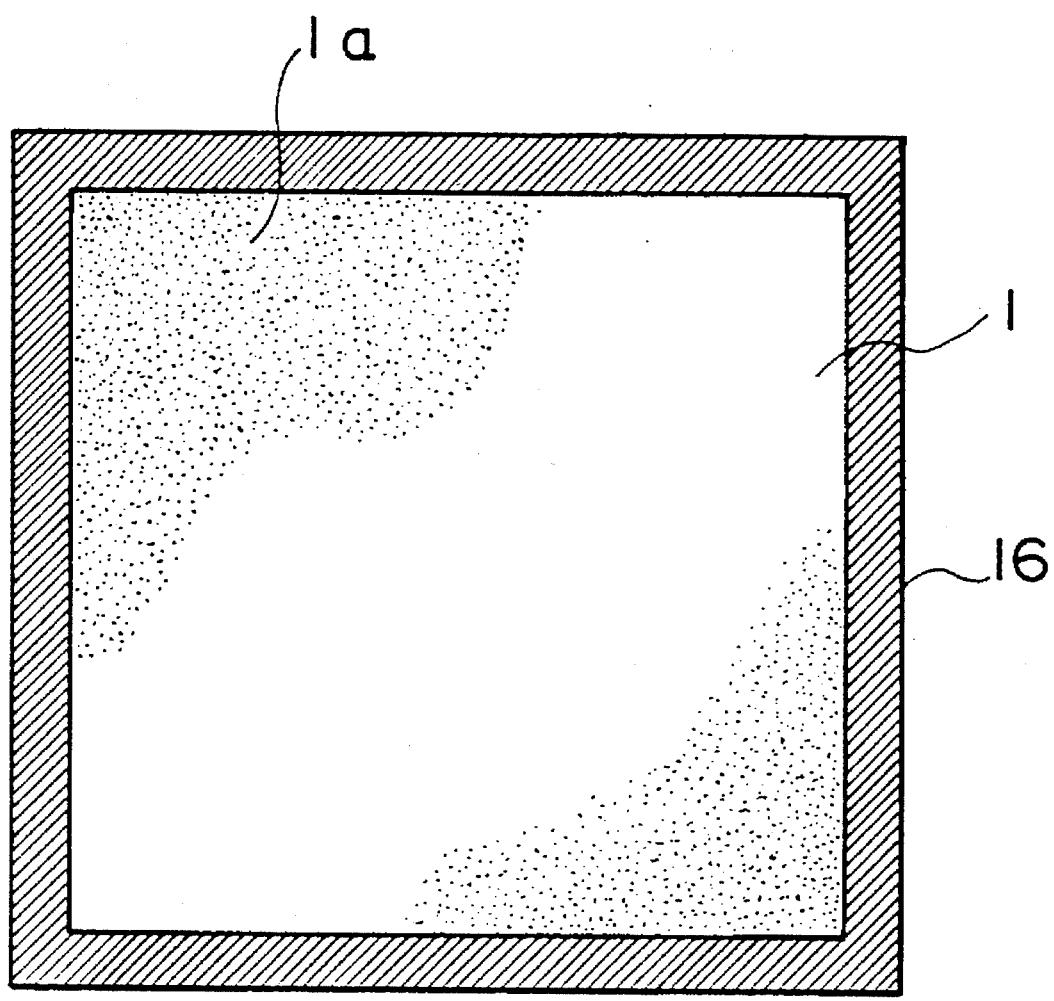
FIG. 10 is a cross-sectional view of a reflection-type screen provided in Example 3.

As shown in FIG. 9, a 200 μm-thick milky ethylene/ethyl acrylate sheet (15) subjected to a corona discharge treatment for rendering both surfaces easily bondable as a white and opaque layer and a 50 μm-thick black polyester film (elastic limit: 90 kg/cm², Young's modulus of elasticity: 4.5×10⁴ kg/cm², bending modulus of elasticity: 2.8×10⁴ kg/cm²) (14) as a dimensionally stable substrate sheet serving also as a black and opaque resin layer were laminated on top of the other through a polyurethane adhesive (8), and after a linear polyester/isocyanate primer layer (9) was provided on the white surface of the sheet, two-color solid printing of a brightening ink described in Example 1 was effected by gravure solid printing to a thickness of 3 μm to provide a high-density light-diffusing/reflecting layer (2). The above-described 120 μm-thick translucent soft vinyl chloride sheet (1) containing a pearl pigment and a columnar lenticular lens embossing plate having a period of 150 μm and a radius of curvature of 75 mm were put in that order on the high-density light-diffusing/reflecting layer, and the laminate was subjected to hot press doubling for integration and, at the same time, provision of an uneven pattern (1a). The reflection-type screen (FIG. 10) of the present invention was placed in such a manner that the direction of the major axis (edge) was vertical, and the half-value angle of the screen was measured and found to be 45°.

Further, neither weave pattern nor uneven formation found in projection sheets provided through a fiber layer was observed. Moreover, a sheet having a size of 150 cm× 112.5 cm was subjected to a winding/unwinding repetition test under conditions of an inner diameter of 30 mm and a tension of 12 kg 50 times. As a result, the test results were good, and neither dimensional change, such as buckling, sagging, wrinkling and elongation, nor a change in surface appearance occurred. Even after the repetition test was repeated 50 times wherein the sheet was wound up round a winding shaft having a diameter of 30 mm and then unwound, neither dimensional change, such as buckling, sagging, wrinkling and elongation, nor a change in surface appearance occurred.

The reflection-type screen of the present invention comprising a dimensionally stable plastic sheet has neither weave pattern nor uneven formation, and the uneven configuration appears on the surface of a projection screen to prevent the occurrence of turbulence of a projected image, moire fringe attributable to interference of pixels with the uneven configuration.

Further, since the screen has a combination of a good dimensional stability with a good flexibility, it can be wound up in a roll form and unwound when used. At that time, neither permanent deformation, such as buckling, sagging, wrinkling and elongation, nor distortion occurs.

We claim:

1. A reflection-type screen comprising:

a dimensionally stable substrate sheet having two opposed major surfaces, an elastic limit of at least 60 kg/cm², a Young's modulus of elasticity of at least 2.5×10⁴ kg/cm², a bending modulus of elasticity of no more than 3.5×10⁴ kg/cm, a thickness of 35 to 200 μm, a center line average height of no more than 100 μm, a center line average height of no more than 100 m, and a waviness of no more than 100 μm;

a high-density light-diffusing/reflecting layer laminated on a first of said two opposed major surfaces of said substrate sheet and comprising a resin containing glitter dispersed therein; and a translucent light-diffusing layer laminated on said high-density light-diffusing/reflecting layer and comprising a resin containing one of glitter and fine powder of calcite dispersed therein, said translucent light-diffusing layer further comprising a light-diffusing fine uneven pattern formed in an outer, exposed surface thereof;

wherein the elongation at breakage, the Young's modulus of elasticity, and the bending modulus of elasticity of said translucent light-diffusing layer are equivalent to those of a soft polyvinyl chloride resin sheet containing 30 to 70 parts be weight of a plasticizer and having a degree of polymerization of 1000 to 2000, and a thickness of 80 to 300 μm.

2. The reflection-type screen of claim 1, further comprising a white opaque resin layer laminated on a second of said two opposed major surfaces of said substrate sheet.

3. The reflection-type screen of claim 2, further comprising a black opaque resin layer laminated on the exposed surface of said white opaque resin layer.

4. The reflection-type screen of claim 1, wherein said dimensionally stable substrate sheet comprises a white opaque and dimensionally stable substrate sheet containing a white pigment dispersed therein and having an opaqueness of at least 90%.

5. The reflection-type screen of claim 1, wherein said dimensionally stable substrate sheet comprises a black opaque and dimensionally stable substrate sheet containing a dark-color pigment.

* * * * *